United States Patent [19]

Hauber

[11] 4,364,600
[45] Dec. 21, 1982

[54] SAFETY VEHICLE SUN ROOF LOCK AND SUPPORT APPARATUS

[76] Inventor: Peter Hauber, 9001 N. Glenoaks, Sun Valley, Calif. 91352

[21] Appl. No.: 278,909
[22] PCT Filed: Feb. 3, 1981
[86] PCT No.: PCT/US81/00164
§ 371 Date: Feb. 3, 1981
§ 102(e) Date: Feb. 3, 1981
[87] PCT Pub. No.: WO82/02691
PCT Pub. Date: Aug. 19, 1982
[51] Int. Cl.³ .............................................. B60J 7/18
[52] U.S. Cl. .......................... 296/218; 292/DIG. 49
[58] Field of Search ................... 296/218, 222, 224; 292/263, DIG. 49

[56] References Cited

U.S. PATENT DOCUMENTS

| | | | |
|---|---|---|---|
| 4,067,605 | 1/1978 | Green et al. | 296/218 |
| 4,120,524 | 10/1978 | Buck, Jr. | 292/263 |
| 4,186,525 | 2/1980 | Carvalho | 296/218 |
| 4,193,628 | 3/1980 | Sorensen | 296/218 |
| 4,205,875 | 6/1980 | Smith | 296/218 |
| 4,216,983 | 8/1980 | Hough et al. | 296/224 |
| 4,257,632 | 3/1981 | DeStepheno | 292/263 |

Primary Examiner—Robert R. Song
Attorney, Agent, or Firm—Wagner & Bachand

[57] ABSTRACT

Passenger safety in vehicles equipped with sun roof accessory is enhanced by provision of a safety vehicle sun roof lock and support apparatus for vehicle sun roof panels movably mounted in a vehicle roof opening circumscribed by a fixed flange. The apparatus comprises a roof panel, a roof opening interfitting flange defining a panel seat, anchor means secured to the flange freely of protrusions engendering personal injury, and an articulated coupler comprising first bar means connected at one end to the panel, and second bar means connected at one end to the anchor means, the first and second bar means being pivotally connected to each other at their respective other ends for locking the panel in seated or opened position relative to the flange, the second bar means being bodily deflectable from its said connected relations for complete panel removal from said flange, the anchor being thereby exposed and, by virtue of its design without exposing injury engendering protrusions. The passenger is thus not exposed to head injury otherwise resultant from jouncing upward in the car into contact with downwardly and outwardly protruding hardware heretofore associated with sun roof accessories.

17 Claims, 8 Drawing Figures

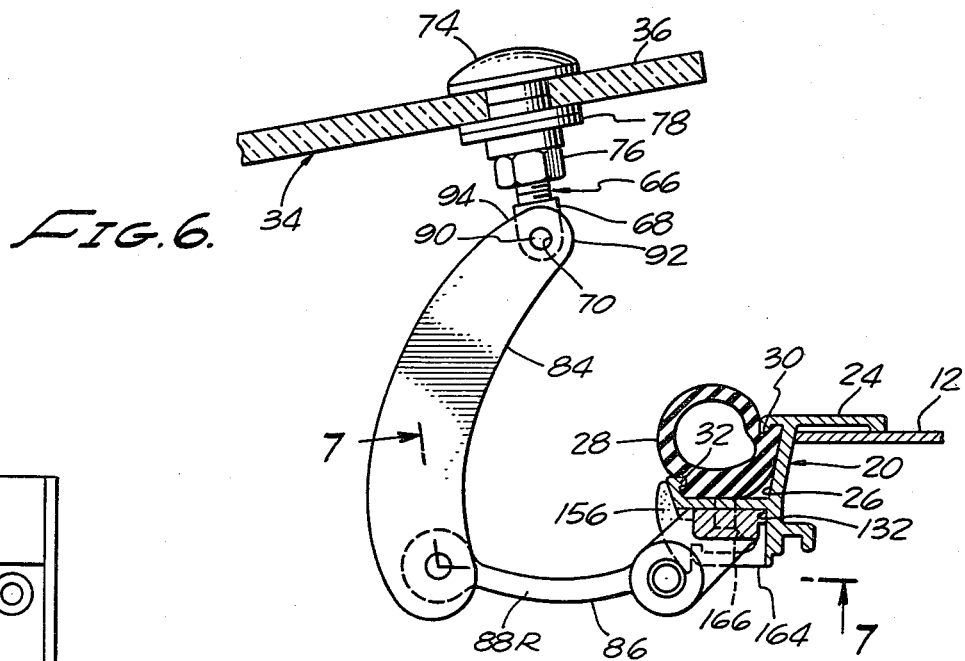
FIG. 6.
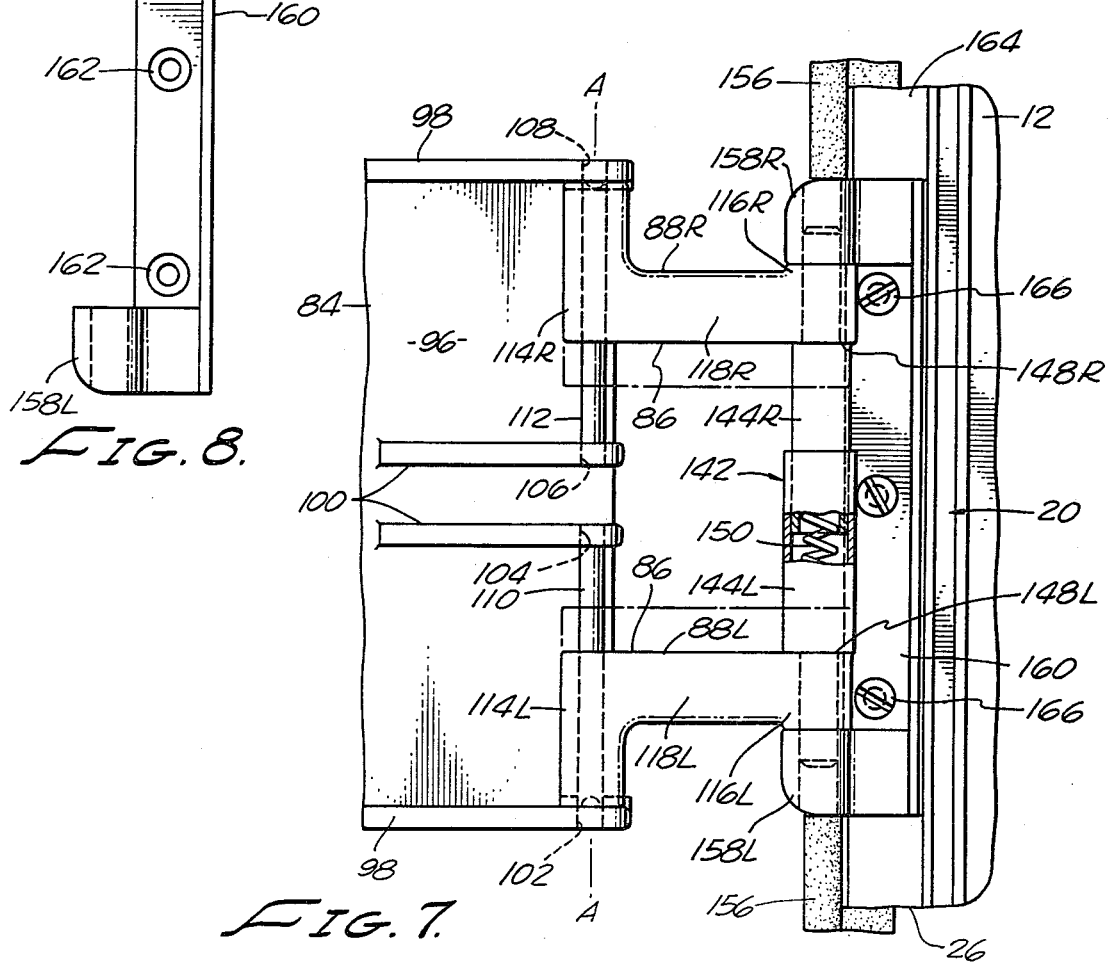
FIG. 8.
FIG. 7.

SAFETY VEHICLE SUN ROOF LOCK AND SUPPORT APPARATUS

TECHNICAL FIELD

This invention has to do with lock and support apparatus for vehicle, especially auto, van and truck, sun roofs. More particularly, the invention is concerned with improvements in the lock and support apparatus presently available for the purpose of securing the movable, usually translucent sun roof panel, to the flange encircling the roof opening.

BACKGROUND ART

Automobiles, trucks and vans typically have sheet metal roofs. It is currently popular to fit these roofs with a hatch-like opening which is openable to admit air and sunshine into the passenger compartment, and lockable in inclement weather or to protect vehicle contents. While "sun roofs" as these auto accessories are generally called are sometimes installed by the factory, there is a considerable after-market sale, particularly for vehicles not available from the factory with a sun roof option. In factory installations, and in after-market installations, the sun roof typically comprises a movable panel, usually transparent to translucent against undue glare, and rectangular in shape, and a mating flange. It is preferred to have the sun roof panel partly openable and fully removable as well. For this purpose latches have been devised which have a handle and strut arrangement coupling of the flange to the panel. The handle and strut are relatively pivotable to opposite over-center conditions to lock the panel down against the gasket used to seal the top of the flange, or to lock the panel tipped up, rearwardly, for admission of air and sunshine into the passenger compartment.

One manner of fastening the panel has been to affix a pair of metal tabs to the flange bearing apertures at the maximum of their protrusion, through which pins are thrust which pass as well through an end of the strut portion of the lock apparatus. Two pairs of metal tabs are used, on spaced portions of the apparatus, for strength and balance. The removal of the roof leaves protruding down in the passenger compartment both pairs of metal tabs, which, in the case of vehicle jouncing, accident, or simple movement of the passenger in his seat, can result in the head impacting these small cross-section tabs, penetrating the skull, with disastrous results. There is a need for a safe sun roof lock and support system and apparatus, one free on unsafe protrusions, and fabricated with designs and materials having maximum safety in use.

DESCRIPTION OF THE INVENTION

It is accordingly an object of the invention to provide safety lock and support apparatus for sun roof panel installation. It is another object to provide panel mounting apparatus which is positive in locking action when installed, free of protrusions likely to engender personal injury whether the panel is in place or not, and which facilitates removal and reinstallation of the panel, by a simple snap in or snap out mechanism.

These and other objects of the invention, to become apparent hereinafter, are realized in the safety vehicle sun roof lock and support apparatus according to the invention for vehicle sun roof panels movably mounted in a vehicle roof opening circumscribed by a fixed flange which comprises a roof panel, a roof opening interfitting flange defining a panel seat, anchor means secured to the flange freely of protrusions engendering personal injury, and an articulated coupler comprising first bar means connected at one end to the panel, and second bar means connected at one end to the anchor means, the first and second bar means being pivotally connected to each other at their respective other ends for locking the panel in seated or opened position relative to the flange, the second bar means being bodily deflectable from its connected relations for complete panel removal from the flange, the anchor being thereby exposed and without exposing injury engendering protrusions.

In particular embodiments: the flange is a channel extrusion defining upper and lower circumferential recesses about the roof opening, and the invention apparatus further includes gasket means in the upper recess in panel seating relation, the anchor means being secured to the extrusion at the lower recess; the first bar means is pivotally connected to the panel by bolt means and defines a hand grip by which the panel is movable; a hinge pin engaging the respective other ends of the first and second bar means is provided; cooperating detent surfaces on the respective other ends of the bar means facilitating blocking movement of the bar means relative to each other in alternate panel open or closed position are provided; and where the flange is a channel extrusion defining a circumferential recess, the anchor means provided comprises a block free of personal injury engendering protrusions and disposed within the flange recess, the block defining pivot means cooperative with the second bar means in anchoring relation; the anchor means can comprise a block free of personal injury engendering protrusions in flange mounted relation, and second bar means pivot structure pivotally mounted on the block and pivotally mounting the second bar means in offset relation; the coupler first bar means is connected to the rear edge margin of the panel, and there is also provided cooperating retainers on the flange and the panel front edge margin pivotally and removably supporting the panel at its front edge; still further provided are means resiliently urging the second bar means into anchor means engagement.

In highly preferred embodiments: the second bar means comprises left and right hand members separately cooperating with the first bar means and the anchor means in panel locking relation; the resilient means then urging the second bar members into anchor means engagement; the resilient means comprises a spring loaded shaft having radially enlarged shoulders, a pair of saddles journaled on the shaft outward of the shoulders, the shaft spring biasing the shaft shoulders to urge the saddles outward against the second bar members, each of the saddles having a pintle received by the anchor means in pivoting relation and radially offset relative to the shaft, the first bar means engaging the members responsive to saddle urging and in outward displacement limiting relation; the flange is a channel extrusion defining upper and lower circumferential recesses about the roof opening, the upper recess being adapted to mount gasket means in panel seating relation; the anchor means comprising a pair of spaced, opposed blocks secured to the extrusion at the lower recess in saddle pintle receiving relation; the first bar means is transversely concave and defines a plurality of outboard and inboard ribs, the plurality of ribs being apertured along a common axis parallel to the shaft axis, first bar hinge pin means secured in the apertures in second bar members mounting relation, and including also bolt means secured to the panel and the first bar means opposite the rib apertures, the first bar means thereby being adapted to define a hand grip by which the panel is movable; a second bar means members hinge pin, and in which the second bar members each comprise a body having a first socket journaling the second bar means hinge pin, a second socket journaling the first bar hinge pin coaxially with the first bar means outboard rib apertures, and a longitudinally curved web between the first and second sockets defining the length of the second bar means members; an axially elongated button on the first bar means extending inwardly along an outboard rib and radially from an aperture in the rib, and a cooperating radially extended recess on the axial face of the member socket opposing the outboard rib and adapted to receive the button in detenting relation in one or another of alternate positions; the coupler first bar means is connected to the rear edge margin of the panel, and there is further provided cooperating retainers on the flange and the panel front edge margin pivotally and removably supporting the panel at its front edge.

In a specific embodiment, the invention provides safety vehicle sun roof lock and support apparatus for vehicle sun roofs, comprising a generally rectangular flange insertable in a vehicle roof opening, the flange comprising an extrusion having upper and lower vehicle opening circumscribing recesses, a gasket fixed in the upper recess, and in the lower recess lock and support apparatus comprising a pair of substantially nonprotruding blocks secured to the flange recess wall, each of the blocks defining one of a pair of opposed, coaxial cylindrical recesses, a mounting saddle at each block, each the saddle comprising first and second radially offset bearing structures and paraxial therewith a pintle extending outward from the saddle to be received in the adjacent block recess, one of the bearing structures being defined by axially spaced annular saddle bearings, a two piece interfitted shaft having a compression spring captured therein, the shaft pieces being terminally radially reduced to define shaft shoulders, the shaft shoulders bearing against the saddles in spring urged relation in shaft journaled condition of the annular saddle bearings thereon, a pair of right hand and left hand lock members comprising a bearing socket journaled on the shaft between the saddle annular bearings, a further socket, and an arcuate web spacing the sockets apart, the members being urged relatively apart outwardly by the shaft spring acting on the saddles, a handle hinged to the members by a hinge pin passing through a series of apertures formed in handle ribs and alternately through the member cylindrical connectors, a panel defining a roof portion and adapted to seat on the gasket in weathertight relation, bolt means depending from the roof panel rear edge margin, bolt connectors carried by the handle for connecting the panel to the handle and thus to the members and the flange, panel front edge retainers pivotally and removably securing the panel from edge to the flange, the handle and the members being relatively pivotable in over-center relation to lock down or support up the panel, the handle and members having cooperating detent structure to maintain the panel in adjusted condition.

THE DRAWINGS

FIG. 6 is a view generally like FIG. 2 and of an alternate embodiment;

FIG. 7 is a sectional view taken on line 7—7 in FIG. 6; and,

FIG. 8 is a bottom plan view of the anchor means of the alternate embodiment.

PREFERRED MODE

Passenger safety in vehicles equipped with a sun roof accessory is enhanced by provision of a safety vehicle sun roof lock and support apparatus for vehicle sun roof panels movably mounted in a vehicle roof opening circumscribed by a fixed flange, according to the invention. The apparatus comprises a roof panel, a roof opening interfitting flange defining a panel seat, anchor means secured to the flange freely of protrusions engendering personal injury, and an articulated coupler comprising first bar means connected at one end of the panel, and second bar means connected at one end to the anchor means, the first and second bar means being pivotally connected to each other at their respective other ends for locking the panel in seated or opened position relative to the flange, the second bar means being bodily deflectable from its connected relations for complete panel removal from the flange, the anchor being thereby exposed and, by virtue of the apparatus design, without exposing injury engendering protrusions. The passenger is thus not exposed to head injury otherwise resultant from jouncing upward in the car into contact with downwardly and outwardly protruding hardward heretofore associated with sun roof mounting, locking and supporting apparatus.

Figure 1:
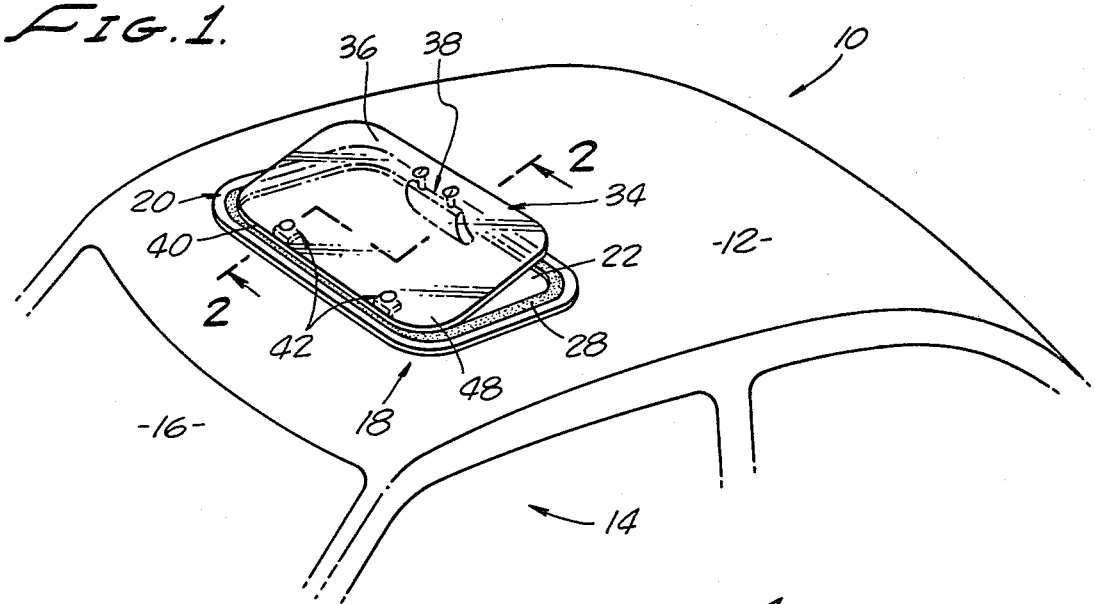
FIG. 1 is a perspective view of the invention apparatus in installed condition on a vehicle, the sun roof panel being open.

With reference now to the drawings in detail, FIG. 1 depicts a vehicle 10 having a sheet metal roof 12. Centrally above the front seat portion 14 of the vehicle passenger compartment 16, a sun roof assembly 18 is provided. The assembly 18 comprises a generally rectangular extruded flange 20 interfitted in a roof opening 22. The vertical profile of flange 20, see FIG. 2, provides a peripheral upper lip 24 to overlie the surrounding roof 12, a circumferential recess 26 into which rubber or plastic tubular gasket 28 is fixed by recess flanges 30, 32, for weathertightly sealing the passenger compartment 16, as will be seen.

Sun roof panel 34 shown as and typically transparent with suitable tinting against glare, is cut from an essentially flat acrylic or like polymer sheet, shaped and sized to cooperate with the flange 20 in covering the flange circumscribed opening 22 and in sealing contact with the gasket 28. In FIG. 1 the sun roof panel 34 is shown upraised, to admit air into the passenger compartment 16, the panel being supported at its rear edge margin 36 by the locking and support device of the invention, indicated at 38. The front edge 40 of the panel 34 is held at the front of flange 20 against the gasket 28 there by retainers indicated at 42.

With particular reference now to FIGS. 2, 3, 4 and 5, the retainers 42, usually employed in pairs, each comprise arcuate ears 44, secured at flat 46 to the front edge margin 48 of the panel 34 by bolt 50, through washer 52, nut 54 and hole 56 in the panel. Injection molded receiver 58 fastened by screw 60 to wall 62 of the flange 20 is slotted at 64 to loosely capture the ear 44, permitting angular movement of the panel 34, illustrated, but blocking vertical and horizontal movement.

Figure 2:
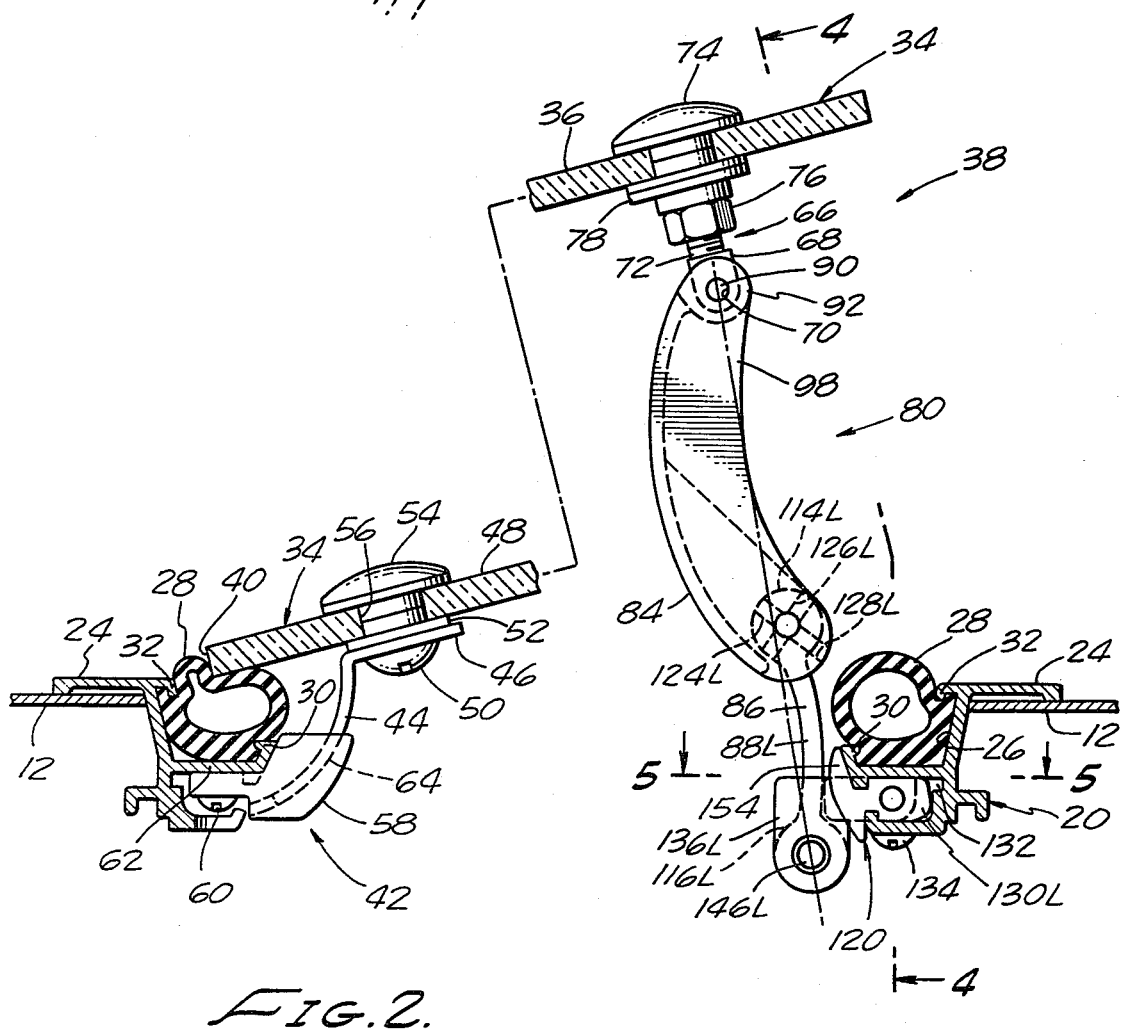
FIG. 2 is a cross-sectional view taken on line 2—2 in FIG. 1.
Figure 3:
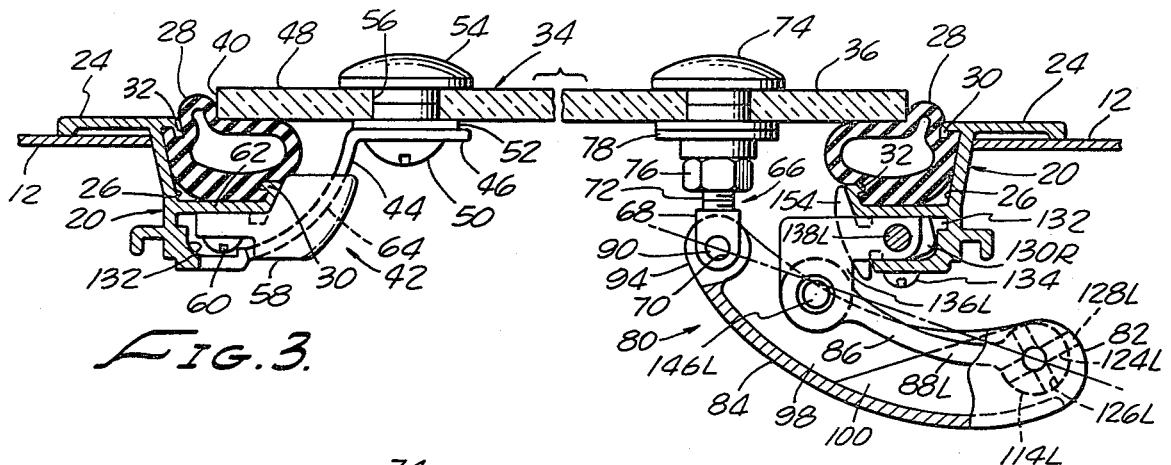
FIG. 3 is a cross-sectional view like FIG. 2 with the sun roof panel closed.
Figure 4:
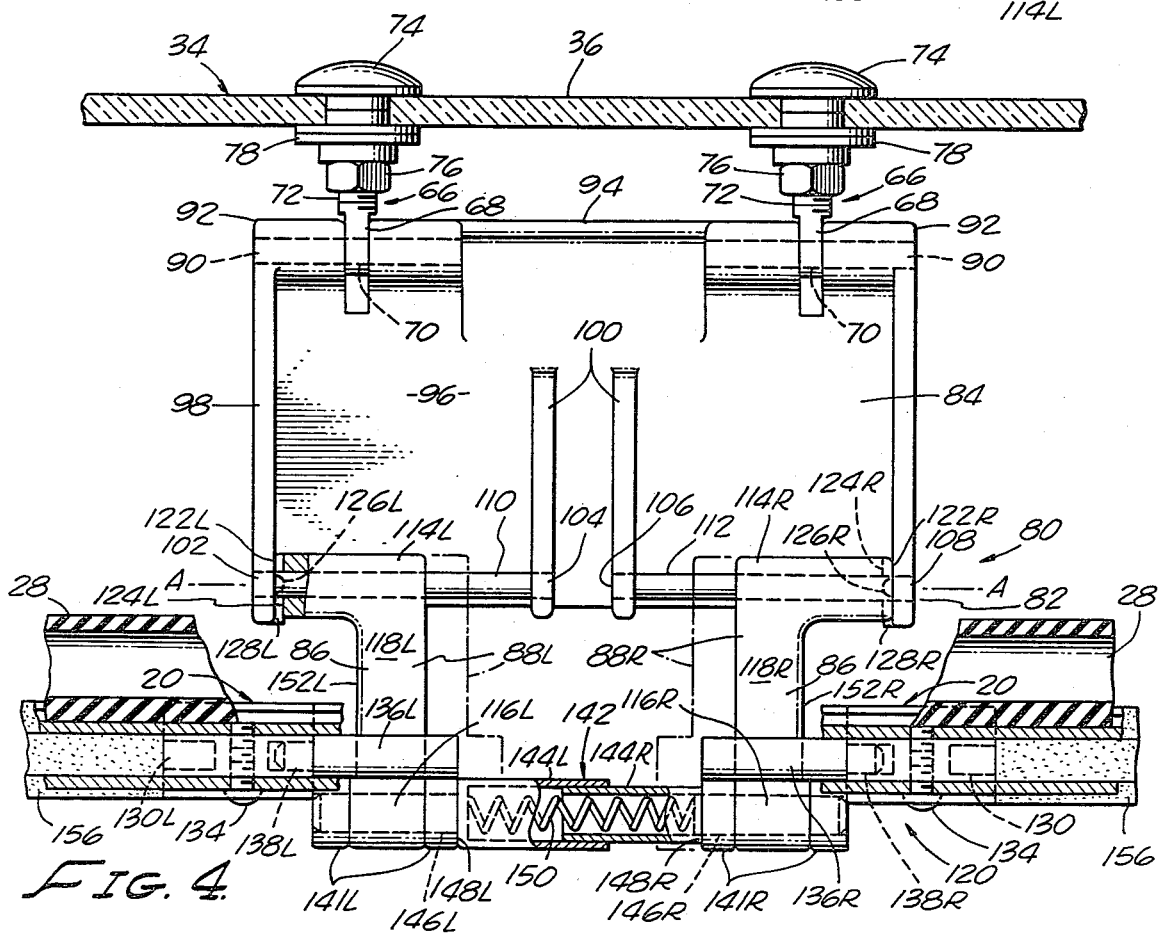
FIG. 4 is a rear elevation view of the safety lock and support, taken on line 4—4 in FIG. 2.
Figure 5:
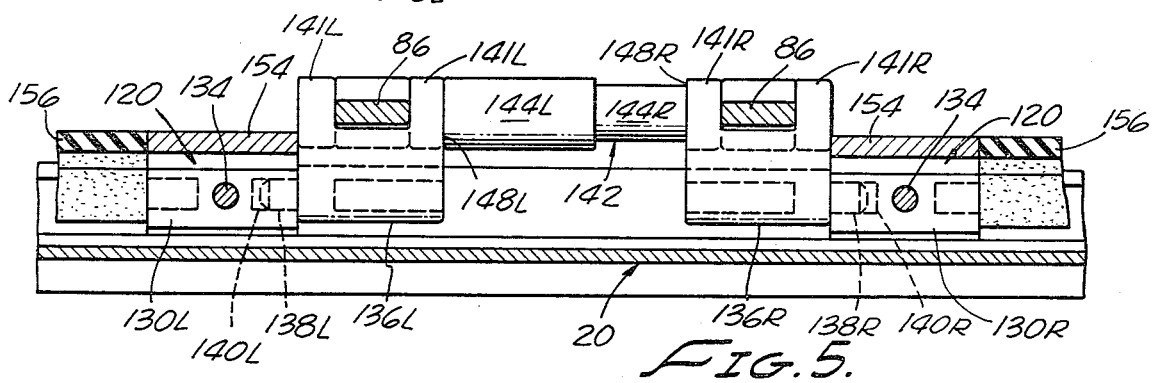
FIG. 5 is a fragmentary horizontal sectional view taken on line 5—5 in FIG. 2.

The lock and support apparatus 38, shown extended in FIGS. 2, 4 and 5 and closed in FIG. 3, is connected to the panel 34 by bolts 66 having vertical heads 68, with transverse bores 70 and threaded shanks 72 by which nut 74 and lock nut 76 secures the bolt to the panel across washers 78. Thusfar described the apparatus is conventional.

The invention lock and support assembly per se is indicated at 80 and comprises an articulated coupler 82 having a first bar 84 suitably molded of high strength plastic and shaped like a handle, and a second bar 86 comprising right and left hand arcuate strut-like members 88R and 88L. The coupler 82 is secured to the bolts 66 by hinge pins 90 extending through bolt bores 70 and pin sockets 92 formed in the upper edge margin 94 of bar 84. Handle shaped first bar 84 is formed to be transversely arcuate and to have a concave underside 96 on which pin sockets 92 are formed, and as well outboard ribs 98 and inboard ribs 100 spaced symmetrically across the axial width of the bar. Ribs 98, 100 are apertured along a common axis A to define an axially aligned series of socket pairs 102, 104, and 106, 108 adapted, respectively, to retain hinge pins 110, 112.

Second bar members 88R and 88L are also suitably molded of high strength plastic and comprise first end sockets 114R and 114L which receive the hinge pins 110, 112, in journaling relation, pivotally mounting the second bar members to the first bar member 84 thereby. The second bar members 88R and 88L further comprise second end sockets 116R and 116L opposite first end sockets 114R, 114L across and coupled by arcuate webs 118R, 118L. Second end sockets 116R, 116L are adapted to mount the second bar members 88R, 88L to the flange 20 using the novel anchor means of the invention indicated at 120.

With further reference initially to FIGS. 2, 3, and 4, the second bar members 88R, 88L, have on the axial faces 122R, 122L of their sockets 114R, 114L, respectively, right angularly disposed diametrical recesses 124R, 126R, and 124L, 126L which cooperate with a radially disposed axially elongated button 128R and 128L formed on the inner surface of outboard ribs 98 of the first bar member 84, as best shown in FIG. 4, to detent the angular relationship of the first and second bars 84, 86, in open or closed position by interfittment of the button in the opposed recess.

It will be observed, see phantom outline in FIG. 4, that the second bar members 88R, 88L are bodily displaceable inward from engagement with the outboard ribs 98, sliding along the hinge pins 110, 112. This displacement enables separation of the panel 34 from the flange 20, for total removal of cover from the passenger compartment 16.

The connection of the second bar members 88R, 88L to the flange 20 to permit pivoting for tilting the panel 34, and removal of the panel as well, while avoiding downwardly dangerously projecting elements, particularly when the panel is totally removed, is a signal feature of the invention. Suitable structure is provided for the purpose including anchor blocks 130R and 130L which are fitted into lower circumferential recess 132 in the flange 20 and secured by screws 134, and saddles 136R, 136L having pintles 138R, 138L, which are received in complementary sockets 140R, 140L formed in the blocks 130R, 130L, as shown. Saddles 136R, 136L have pairs of bearings 141R, 141L which define a journal for shaft 142.

Shaft 142 comprises two interfitted halves 144R, 144L, each defining a reduced diameter end portion 146R, 146L and shoulders 148R, 148L at the diameter transition. A compression spring 150 within the halves 144R, 144L urges the halves outward. The shaft end portions 146R, 146L are journaled in the second bar members second sockets 116R, 116L, with the saddle pairs of bearings 141R, 141L on either side thereof, as best shown in FIGS. 4 and 5, with shaft shoulders 148R, 148L engaging the bearings adjacent urging, under the influence of spring 150, the saddles 136R, 136L and thus bar members 88R, 88L outward. Thus pivoted, the bar members 84, 86 are capable of articulated motion to opposite extremes defining over-center locking, compare FIG. 2 and FIG. 3.

Pinching the bar members 88R, 88L at points 152R, 152L overcomes the force of spring 150, the saddles 136R, 136L are carried inward removing pintles 138R, 138L from the block sockets 140R, 140L, and enabling removal of the panel 34 entirely from the flange 20.

Removal of the panel 34, removes the saddles 136R, 136L which were supporting the panel offset from the flange 20. Significantly, the anchor blocks 130R, 130L as will be observed are free of hazardous protrusion beyond the flange recess 132. Skirt 154 on blocks 130R and 130L is contoured to compliment the beading (not shown) which normally closes the recess 132 elsewhere around the flange 20. Whatever extension of the blocks 130R, 130L there is beyond the recess 132 therefore is rounded and safe.

In the alternate embodiment shown in FIGS. 6, 7, and 8, wherein like parts have like numbers, the anchor blocks of the first embodiment have been changed to enable mounting of the anchor means with or without a preformed channel or recess on the flange. The saddles are omitted. Thus, anchor blocks 158R and 158L in FIGS. 6–8, are carried on a common base 160, the base having screw holes 162 enabling mounting of the base to the flange 20 within the circumferential recess 132, as shown, or on the lowermost wall 164 of the flange, by driving screw fasteners 166 into the flange opposite the base holes. With either mounting arrangement, the projection of any portion of the blocks 158R and 158L is minimal, rounded, and safe. Nonetheless, the offset mounting of the panel 34 lock and support bars 84, 86 is retained. The panel removal and insertion is effected in the alternate embodiment, as described for the first embodiment.

The objectives of the invention are thus met: a safety lock and support apparatus for sun roof panel installation is provided, which is positive in locking and free of protrusions likely to engender personal injury, and which facilitates removal and reinstallation of the panel, by a simple snap in or snap out mechanism. Small cross-section metal tabs are avoided, and strength of connection mainatained by using thick cross-section material of lesser unit strength, but of sufficient strength in the thickness used. The anchor blocks in addition are preferably recessed in the panel mating flange.

I claim:

1. Safety vehicle sun roof lock and support apparatus for vehicle sun roof panels movably mounted in a vehicle roof opening circumscribed by a fixed flange, said apparatus comprising a roof panel, a roof opening interfitting flange defining a panel seat, anchor means secured to the flange freely of protrusions engendering personal injury, and an articulated coupler comprising first bar means connected at one end to the panel, and second bar means having left and right hand portions separably connected at one end to the anchor means in biased relation, said first and second bar means being pivotally connected to each other at their respective other ends for locking the panel in seated or opened position relative to the flange, said second bar means being separable from its anchor means connection for complete panel removal from said flange, said anchor means being thereby exposed and without exposing injury engendering protrusions.

2. Safety vehicle sun roof lock and support apparatus for vehicle sun roof panels according to claim 1, in which said flange is a channel extrusion defining upper and lower circumferential recesses about said roof opening, and including also gasket means in said upper recess in panel seating relation, said anchor means being secured to said extrusion at said lower recess.

3. Safety vehicle sun roof lock and support apparatus for vehicle sun roof panels according to claim 1, in which said first bar means is pivotally connected to said panel by bolt means and defines a hand grip by which the panel is movable.

4. Safety vehicle sun roof lock and support apparatus for vehicle sun roof panels according to claim 1, including also a hinge pin engaging the respective other ends of said first and second bar means.

5. Safety vehicle sun roof lock and support apparatus for vehicle sun roof panels according to claim 1, including also cooperating detent surfaces on said respective other ends of said bar means facilitating blocking movement of said bar means relative to each other in alternate panel open or closed position.

6. Safety vehicle sun roof lock and support apparatus for vehicle sun roof panels according to claim 1, in which said flange is a channel extrusion defining a circumferential recess, said anchor means comprises a block free of personal injury engendering protrusions and disposed within said flange recess, said block defining pivot means cooperative with said second bar means in anchoring relation.

7. Safety vehicle sun roof lock and support apparatus for vehicle sun roof panels according to claim 1, in which said anchor means comprises a block free of personal injury engendering protrusions in flange mounted relation, and second bar means pivot structure pivotally mounted on said block and pivotally mounting said second bar means in offset relation.

8. Safety vehicle sun roof lock and support apparatus for vehicle sun roof panels according to claim 1, in which said coupler first bar means is connected to the rear edge margin of said panel, and including also cooperating retainers on said flange and said panel front edge margin pivotally and removably supporting said panel at its front edge.

9. Safety vehicle sun roof lock and support apparatus for vehicle sun roof panels according to claim 1, including also means resiliently biasing said second bar means into anchor means engagement.

10. Safety vehicle sun roof lock and support apparatus for vehicle sun roof panels movably mounted in a vehicle roof opening circumscribed by a fixed flange, said apparatus comprising a roof panel, a roof opening interfitting flange defining a panel seat, anchor means secured to the flange freely of protrusions engendering personal injury, and an articulated coupler comprising first bar means connected at one end to the panel, second bar means comprising left and right hand members cooperating with said first bar means and said anchor means in panel locking relation, said first and second bar means being pivotally connected to each other at their respective other ends for locking the panel in seated or opened position relative to the flange, and means resiliently urging said second bar members into anchor means engagement, said second bar means being separable from its anchor means connection for complete panel removal from said flange, said anchor means being thereby exposed and without exposing injury engendering protrusions.

11. Safety vehicle sun roof lock and support apparatus for vehicle sun roof panels according to claim 10, in which said resilient means comprises a spring loaded shaft having radially enlarged shoulders, a pair of saddles journaled on said shaft outward of said shoulders, said shaft spring biasing the shaft shoulders to urge said saddles outward against said second bar members, each of said saddles having a pintle received by said anchor means in pivoting relation and radially offset relative to said shaft, said first bar means engaging said members responsive to saddle urging and in outward displacement limiting relation.

12. Safety vehicle sun roof lock and support apparatus for vehicle sun roof panels according to claim 11 in which said flange is a channel extrusion defining upper and lower circumferential recesses about said roof opening, said upper recess being adapted to mount gasket means in panel seating relation, said anchor means comprising a pair of spaced, opposed blocks secured to said extrusion at said lower recess in saddle pintle receiving relation.

13. Safety vehicle sun roof lock and support apparatus for vehicle sun roof panels according to claim 12, in which said first bar means is transversely concave and defines a plurality of outboard and inboard ribs, said plurality of ribs being apertured along a common axis parallel to the shaft axis, first bar hinge pin means secured in said apertures in second bar members mounting relation, and including also bolt means secured to said panel and said first bar means opposite said rib apertures, said first bar means thereby being adapted to define a hand grip by which the panel is movable.

14. Safety vehicle sun roof lock and support apparatus for vehicle sun roof panels according to claim 13, including also a second bar means members hinge pin, and in which said second bar members each comprise a body having a first socket journaling said second bar means hinge pin, a second socket journaling said first bar hinge pin coaxially with said first bar means outboard rib apertures, and a longitudinally curved web between said first and second sockets defining the length of said second bar means members.

15. Safety vehicle sun roof lock and support apparatus for vehicle sun roof panels according to claim 14, including also an axially elongated button on said first bar means extending inwardly along an outboard rib and radially from an aperture in said rib, and a cooperating radially extended recess on the axial face of said member cylindrical connector opposing said outboard rib and adapted to receive said button in detenting relation in one or another of alternate positions.

16. Safety vehicle sun roof lock and support apparatus for vehicle sun roof panels according to claim 15, in which said coupler first bar means is connected to the rear edge margin of said panel, and including also cooperating retainers on said flange and said panel front edge margin pivotally and removably supporting said panel at its front edge.

17. Safety vehicle sun roof lock and support apparatus for vehicle sun roofs, comprising a generally rectangular flange insertable in a vehicle roof opening, said flange comprising an extrusion having upper and lower vehicle opening-circumscribing recesses, a gasket fixed in the upper recess, and in the lower recess lock and support apparatus comprising a pair of substantially non-protruding blocks secured to the flange recess wall, each of said blocks defining one of a pair of opposed, coaxial cylindrical recesses, a mounting saddle at each block, each said saddle comprising first and second radially offset bearing structures and paraxial therewith a pintle extending outward from the saddle to be received in the adjacent block recess, one of said bearing structures being defined by axially spaced saddle annular bearings, a two piece interfitted shaft having a compression spring captured therein, said shaft pieces being terminally radially reduced to define shaft shoulders, said shaft shoulders bearing against said saddles in spring urged relation in shaft journaled condition of the annular saddle bearings thereon, a pair of right hand and left hand lock members comprising a socket journaled on said shaft between said saddle bearings, a further socket, and an arcuate web spacing said sockets apart, said members being urged relatively apart outwardly by said shaft spring acting on said saddles, a handle hinged to said members by a hinge pin passing through a series of apertures formed in handle ribs and alternately through said member sockets, a panel defining a roof portion and adapted to seat on said gasket in weather-tight relation, bolt means depending from said roof panel rear edge margin, bolt connectors carried by said handle for connecting said panel to said handle and thus to said members and the flange, panel front edge retainers pivotally and removably securing the panel from edge to the flange, said handle and said members being relatively pivotable in over-center relation to lock down or support up the panel, said handle and members having cooperating detent structure to maintain the panel in adjusted condition.

* * * * *